United States Patent Office 3,495,462
Patented Feb. 17, 1970

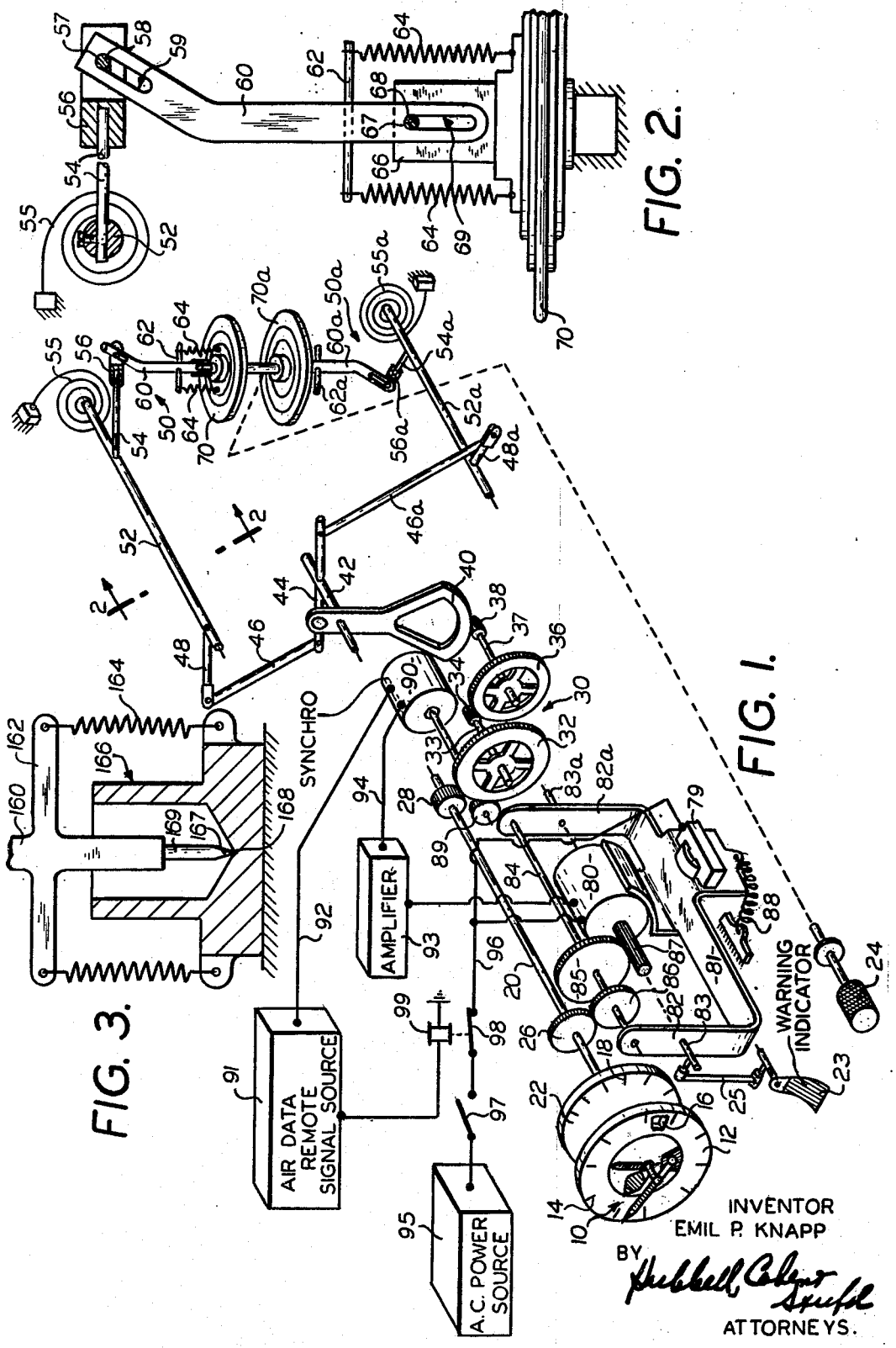

3,495,462
PROTECTIVE LINKAGE IN ELECTRICALLY AND PRESSURE ACTUATED INSTRUMENT
Emil P. Knapp, New Fairfield, Conn., assignor to Lear Siegler, Inc., Armonk, N.Y., a corporation of Delaware
Filed Dec. 5, 1967, Ser. No. 688,044
Int. Cl. G01l 7/12
U.S. Cl. 73—386           8 Claims

ABSTRACT OF THE DISCLOSURE

A longitudinal link is interposed in the linkage connecting an aneroid capsule to a read-out means in an instrument having an alternative means for driving the read-out means, the link being connected at both ends by lost motion connections that are spring biased to normal conditions but can operate to assume a non-driving position when the input from the alternative driving means is significantly different from the input from the aneroid capsule, whereby to protect the capsule from damage.

BACKGROUND OF THE INVENTION

Field of the invention

The present invention relates to a protective linkage for an aneroid capsule in an altimeter or other indicating device having an additional input means capable of generating greater torque than the aneroid capsule.

Description of the prior art

An altimeter which normally indicates altitude data received from a remote signal source by driving the indicator with an electric motor and which also utilizes a pressure-sensitive capsule for alternative altimeter readings is described in U.S. Patent No. 3,230,775.

The use of a flexible shaft in a somewhat similar altimeter is shown in U.S. Patent No. 3,083,575.

SUMMARY

The present invention comprises a protective link, useful in a device such as the altimeter shown in U.S. Patent No. 3,230,775. Such an altimeter comprises indicating means, such as a dial face with rotatable pointers, a rotatable shaft for driving the indicating means, and two data input means, such as a servo motor operated by the signal from a radar altimeter or other electronic source of altitude information, and a pressure sensitive device such as an aneroid capsule. Suitable means for operatively connecting each data input device to the rotatable shaft are provided.

The present linkage protects the pressure sensitive device, here a delicate aneroid capsule, from distortion and damage resulting from overriding external force transmitted from the servo motor. The link of the present invention is capable of selectively transmitting force from the diaphragm capsule when there is no opposing force but of moving into a non-transmitting position when an overriding force resists the capsule movement.

BRIEF DESCRIPTION OF THE DRAWINGS

FIG. 1 is a perspective view, partly diagrammatic, of an altimeter in which the present invention is incorporated;

FIG. 2 is a sectional view taken along the line 2—2 of FIG. 1; and

FIG. 3 is a fragment of the view in FIG. 2 illustrating an alternative embodiment of the present invention.

DESCRIPTION OF THE PREFERRED EMBODIMENTS

FIG. 1 shows the present invention in conjunction with a two input altimeter, although the invention may be employed with other twin input instruments. Such an altimeter for purposes of illustration is of the type shown and described in U.S. Patent No. 2,830,775 granted to John H. Andresen, Jr. on Jan. 25, 1966, for Altimeter, and assigned to the assignee hereof. Such an altimeter comprises a dial 12 having marked thereon a suitable scale 14 of altitude designations. As shown, the dial 12 is provided with a cutout or window 16 through which the markings of barometric settings 18 on a sub-dial 22 may be viewed. Cooperating with the face dial 12 is an indicating means in the form of the conventional three pointer display 10 for indicating measured altitudes.

Means for manually setting the barometric reading on sub-dial 22 includes a control knob 24 which is suitably geared to the sub-dial 22 in the conventional well-known manner.

In the illustrated embodiment, the pointer display 10 is operatively connected to a pointer display shaft 20. Fixed on the shaft 20 in spaced relationship are a clutching gear 26 and a pinion 28. Pressure actuation of the pointer shaft 20 and connected display 10 is effected by a pair of evacuated diaphragm capsules 70 and 70a, which expand and contract in response to changes in ambient pressure.

Each of the capsules 70 and 70a is connected by a linkage 50 and 50a, respectively, to rocker shafts 52 and 52a for rotating the rocker shafts, in response to expansion and contraction of the capsules. The present improvement is contained within the linkages 50 and 50a and will be described in greater detail hereinafter.

The rocker shafts 52 and 52a have secured thereto radially extending rocker arms 48 and 48a, respectively, which rocker arms are pivotally connected to links 46 and 46a at one end of said links, the other ends of the links being pivotally connected to the rocker arm 44 that is affixed to a center rocker shaft 42. Also secured to the rocker shaft 42 is the gear sector 40. It will be obvious that during normal operation, as the capsules 70 and 70a expand and contract, through the previously described shafts, links and rocker arms, torque will be applied to the sector 40 for rotating the sector about the center rocker shaft 42.

The gear sector 40 in turn is mechanically connected to the pointer display shaft 20 through the means of a gear train 30. In the illustrated embodiment the gear train 30 comprises a pinion 38 meshing with the gear sector 40. The pinion 38 is coupled by a shaft 37 to a driven gear 36. The latter in turn meshes with a pinion 34 which is coupled by a second shaft 33 to a driving gear 32 which meshes with the shaft pinion 28 to drive the pointer shaft 20. Thus this portion of the altimeter comprises a mechanically operated instrument deriving its power to position the pointer display 10 from the expansion and contraction of the aneroid capsules 70 and 70a.

The altimeter also has geared to its pointer display shaft 20 a synchro 90 at an integral ratio, such as five to one or ten to one, depending upon the rotation rate of the synchro described below. The illustrated syncho 90 is electrically analogous to a synchro control transformer, but has no brushes, and has a rotor assembly weighing less than one (1) gram. As shown, its rotor is geared by pinion 89 to the driving gear 32.

The synchro 90 is electrically connected to a remote altitude signal source 91, e.g. an air data computer or radar altimeter, by line 92. Co-operatively associated with the synchro 90 is a servo motor 80 with an amplifier 93 being interposed in a circuit 94 between the synchro 90 and the motor 80 for amplifying the signal from the synchro.

The motor 80 is carried in a yoke 81 which is pivotally mounted on pivots 83, 83a for movement of a shaft 84 toward and away from the pointer display shaft 20. The shaft 84 extends between the arms 82, 82a of the yoke 81 and is journaled therein. Shaft 84 is driven by gear 85, which is disposed in meshing relationship with the pinioned spindle 87 of the motor 80. Coupled on the yoke shaft 84 with the driven gear 85 is a second gear 86 which is adapted to be moved into and out of meshing relationship with the clutching gear 26 on the pointer display shaft 20.

The yoke 81 is moved toward the pointer shaft 20 to effect meshing of gears 86 and 26 when its activating solenoid 79 is energized to overcome the force of a spring means 88 which normally biases the yoke 81 toward inoperative position.

The motor 80 and solenoid 79 are connected in a common circuit to an A.C. power supply 95. Interposed in the circuit 96 is a normally open switch 97 for manual selection of the mode of operation of the altimeter. When the switch 97 is closed, the solenoid 79 becomes energized, causing the yoke 81 to pivot toward the pointer shaft 20 to effect meshing of gears 26 and 86 and energizing the motor 80. When this occurs, and the remote altitude signal source 91 is operating properly, the remote altitude signal input to the synchro 90 will cause the motor 80, through its associated gear train 85, 86, to override any torque input from the diaphragm capsules 70, 70a, as described in detail below.

As shown in FIG. 1, the motor 80 and the synchro 90 form a synchro type servo repeater which follows the fine synchro transmitter of the remote source of altitude information 91, e.g. an air data computer or radar altimeter. With the altimeter of the illustrated embodiment it is not necessary to transmit the course information so long as pressure indication and servoed information differ by less than one-half turn of synchro 90 since the diaphragm mechanism keeps the synchro rotor always within a half turn of the correct altitude.

With the opening of switch 97, the solenoid becomes deenergized and the yoke 81 under the bias of the spring 88 moves away from the pointer shaft 20, and thus effects disengagement of the gears 26 and 86; also the motor 80 is deenergized. When this occurs the pointer shaft 20 is rendered directly responsive to pressure actuation by the diaphragm capsules 70, 70a, as described in detail below.

Included in the circuit 96 between the A.C. power 95 and the motor 80 and solenoid 87 is a relay 99 for maintaining a pair of contacts 98, disposed in series with switch 97, normally closed. Thus in the event of any power failure in the remote control signal source 91, the relay 99 will be deenergized, thus opening the contacts 98. If and when this occurs the pointer shaft 20 is automatically reverted to pressure responsive actuation by the capsules 70, 70a, since the opening of the contacts 98 will deenergize the solenoid 79, causing the yoke 81 to move away from the clutching gear 26.

A warning indicator in the nature of a warning flag 23 is operatively connected with the yoke 81 for indicating to the pilot the mode of altimeter activation. As shown in FIG. 1, a warning flag 23 is connected to the yoke 81 through a suitable mechanical linkage connection 25 constructed and arranged to pivot the flag 23 into visible position on the face of the altimeter whenever the solenoid 79 is deenergized. When this occurs the visibility of the flag 23 will indicate that the altimeter is operating by diaphragm power only. Because of the mechanical linkage 25, it becomes impossible for the warning flag 23 to operate incorrectly since the flag 23 is mechanically linked to the motor engaging yoke 81. Thus the arrangement makes it impossible for the warning flag 23 to give a false indication when the gears 26 and 86 are disengaged without physically breaking off the flag or the connecting linkage. Depending on the user's preference, a flag can indicate one or more of the following conditions: power failure, failure of servo to null, open lead in synchro, hardover signal, and manual control set for standby operation.

It is possible that during the operation of the previously described altimeter that the input from the motor 80 to the shaft 20 will be significantly different from the input to the shaft from the aneroid capsules 70 and 70a. Since the torque applied to the shaft 20 from the motor 80 is significantly greater than the torque from the aneroid capsules 70 and 70a, the capsule outputs will be substantially overridden, and the capsules themselves could be subjected to significant stresses, which stresses could damage the capsules. In accordance with the present invention, means are provided in the linkages 50 and 50a to relieve the capsules 70 and 70a respectively from damaging stresses resulting from such a condition. For convenience, the construction and operation of one linkage 50 is described below, although it will be understood that the other linkage 50a is constructed identically and cooperates accordingly.

Referring now to FIGS. 1 and 2, it is seen that a diaphragm center piece 66, having a slot into which an end of a link 60 may freely move, is fixed to the aneroid capsule 70. Fixed within the slot of the diaphragm center piece 66 is a pin 68 which extends across the slot and through a longitudinal slot 69 in the link 60. The link 60 is biased to a normal position, as shown in FIG. 2, by tension springs 64 the ends of which are respectively connected to the diaphragm center piece 66 of the aneroid capsule 70 and a cross arm 62 fixed to and extending from the link 60. Said normal position of the link 60 is such that pin 68 rests against or abuts the upper end of slot 69, which slot end thereby comprises a seat 67 for pin 68. At the opposite end of the link 60 is a second longitudinal slot through which a pin 58 extends. Pin 58 is slidable within slot 59 but is normally positioned in a manner hereinafter described to rest against the upper end of the slot which thereby constitutes the seat 57. As shown, the pin 58 is attached to a fork 56, which is mounted on to the rocker arm 54, although if desired pin 58 could be secured to a temperature compensator mounted on the arm 54 in the manner known to the art. Rocker arm 54 is fixed to rocket shaft 52, which is biased by a spring 55 in a counterclockwise direction as viewed in FIG. 2, whereby to bias pin 58 toward its normal position at the upper end of slot 59. It is to be noted that the spring 55 is weaker, i.e. has a lower force constant, than the springs 64, so that the seat 67 of the link 60 is held firmly against pin 68 in normal operation.

The pressure responsive operation of the altimeter is as follows. As described above, when either the switch 97 or the contacts 98 in the circuit 96 are opened, the solenoid 79 is deenergized, and the spring 88 pivots the yoke 81 to disengage gear 86 from the clutching gear 26 on the pointer shaft 20. When the altimeter is in such operative condition, the aneroid capsules 70, 70a are the only source of torque for driving the pointer shaft 20. For clarity of presentation, the operation of one capsule 70 and its associated linkages is described, although it will be understood that the other capsule 70a and its associated linkages cooperate accordingly.

As the aircraft descends, the increasing static pressure of the atmosphere causes the capsule 70 to contract, moving diaphragm center piece 66 and pin 68 downward as viewed in FIG. 2. The link 60, being biased to about the pin 68 by the springs 64, remains in contact with the pin 68 and moves therewith, pulling pin 58 downward, as pin 58 abuts the seat 57. The downward movement of the pin 58 is transmitted by the arm 54 to the shaft 52 as clockwise rotation as viewed in FIG. 2. The rotation of shaft 52 causes rotation of the gear sector 40 by the rocker linkages hereinabove described. Rotation of the gear sector 40 is transmitted through the gear train 30 to the pointer shaft 20, which rotation moves the pointers 10 to positions indicating the lower altitude.

As the plane ascends, the capsule 70 expands with decreasing static pressure, moving the diaphragm center piece 66 and pin 68 upward as viewed in FIG. 2. Because the pin 68 abuts the upper end of slot 69, namely the seat 67, the upward movement of the pin 68 is transmitted directly to the link 60, which accordingly moves upward. As the link 60 moves upward, carrying the slot 59, the pin 58 abutting the upper end of the slot 59 is moved upward to follow the motion of the link 60 by the counterclockwise rotation of the arm 54 and shaft 52, which are biased rotationally by the spiral spring 55. The counterclockwise rotation of the rocker shaft 52 is transmitted as described hereinabove to the pointers 10, causing them to indicate the increasing altitude.

In normal operation of the altimeter, switch 97 is closed, energizing solenoid 79 to thereby cause the yoke 81 to assume the position shown in FIG. 1, wherein gear 86 is in mesh with gear 26. Thus the pointer display shaft 20 fixed to gear 26 is rotated when the motor 80 is operated, the rotation being transmitted from the motor spindle 87 through gears 85 and 86 to gear 26. With changes in the altitude data supplied by the signal source 91 to the synchro 90, the motor 80 is caused to rotate the shaft 20, as aforesaid, thereby positioning the pointer 10 to display the altitude data.

When the motor 80 rotates the pointer shaft 20 as aforesaid, such motion is transmitted to the rocker arms 54 and 54a from gear 28, through the gear train 30, the sector 40, and the rocker linkages hereinabove described. In normal operation, the altitude data supplied by the signal source 91 will correspond closely to the barometric altitude determined by the capsules 70, 70a. Thus the motion transmitted from the motor 80 to the rocker arms 54 and 54a will usually correspond to the expansion or contraction of the capsules 70 and 70a. Thus, as altitude changes, corresponding forces are presented at each end of the links 60 and 60a, so that the links 60 and 60a serve to couple the capsules 70, 70a directly to the rocker arms 54 and 54a respectively, with no stress on the linkages.

For example, as the aircraft descends, the signal source 91 supplies a signal indicating the decrease in altitude to the synchro 90, which will thereby produce a signal that is transmitted through the amplifier 93 to operate the servo motor 80. Rotation of the motor 80 causes rotation of the pointer shaft 20 and corresponding change in the position of the pointer 10. The rotation of the pointer shaft 20 is also transmitted, as described hereinabove, to the rocker arm 54 as a clockwise movement, as viewed in FIG. 2, and thus as a downward movement of the pin 58. At the same time, the increasing static pressure causes the capsule 70 to contract, moving the diaphragm center piece 66 and pin 68 downward. As the pin 68 moves downward the link 60 tends to follow such motion, being biased in a downward direction by the tension springs 64. Because the pin 58 is simultaneously moved downward in response to the motion of the motor 80, as aforesaid, there is no force upon the link 60 to oppose the biasing force of the springs 64, and so the link 60 follows the downward motion of the pin 68, so that the pin 68 remains closely abutting the seat 67. Because the downward motion of the pin 58 is of about the same extent as the motion of the pin 68, the pin 58 also remains abutting the seat 57 and the capsule 70 is not unduly stressed. As noted hereinabove, the simultaneously operation of the linkages associated with the capsule 70a is analogous herewith; a repetitive description thereof is accordingly omitted.

As the aircraft ascends, the signal source 91 causes the synchro 90 to operate the motor 80 to rotate the pointer shaft 20, which rotation causes the pointers to move to indicate the increased altitude. The rotation of the pointer shaft 20 is also transmitted, as hereinabove described, to the rocker arm 54 as a counterclockwise rotation, causing the pin 58 to move upward, as viewed in FIG. 2. Simultaneously, the decreasing static pressure causes the aneroid capsule 70 to expand, moving the diaphragm center piece 66 and the pin 68 upward. Because the pins 58 and 68 abut the upper ends of the slots 59 and 69 respectively, the simultaneous upward motion of both pins causes the link 60 to move upward therewith and, again, the capsule is not unduly stressed.

However, when the abnormal condition arises in which the motor 80 is caused to drive the pointer shaft 20 to display an altitude substantially different from the altitude as determined by the aneroid capsules 70 and 70a, it is evident that the motion transmitted to rocker arms 54 and 54a will not correspond to the motion of the aneroid capsule 70 and 70a.

For example, if the altitude data from the signal source 91 indicates a lower altitude and thus a higher pressure than that sensed by the aneroid capsules 70 and 70a, and motor 80 will cause the altimeter to display the lower altitude, because it is capable of generating sufficient torque to rotate the pointer shaft 20 to any position, irrespective of the condition of the capsules 70, 70a.

With respect to one of the capsules 70, this rotation, as aforesaid, will be transmitted to the rocker arm 54 as a clockwise rotation, as viewed in FIG. 2, and as a downward movement of the pin 58, which would tend to crush the capsule 70 if such downward movement were transmitted directly thereto. However, in accordance with the present improvement, the link 60 is constructed with lost motion means permitting the pin 58 to move downward in this instance without moving the link 60. As shown in FIG. 2, when the pin 58 moves downward it can move away from the seat 57 and into the central portion of slot 59. The link 60 is unaffected by the change in position of pin 58. In accordance with the present invention, the slot 59 is of such extent to protect against any expected discrepancy between the two input means by being made long enough so that the pin 58 does not reach the opposite end of the slot when driven away from the seat 57. Thus, the lost motion connection of pin 58 and slot 59 prevents the possible crushing of the capsule under the stated abnormal condition.

In the event that the signal source indicates a higher altitude, and thus a lower pressure, than that sensed by the aneroid capsule 70, the motor 80 will rotate the pointer shaft 20 to a new position, causing the pointers 10 to indicate the increased altitude. The rotation of the shaft 20 is transmitted, as aforesaid, to create a counterclockwise torque on arm 54. Such torque creates a tendency for upward motion in the pin 58. Because the pin 58 abuts the seat 57 of link 60, the upward force of the pin is transmitted to the link 60. If such upward force were transmitted directly to the capsule 70, it would tend to rupture the capsule, but according to the present improvement, the link 60 moves upward and extends the tension springs 64 between cross arms 62 and capsule 70. As the link 60 moves upward, seat 67 is correspondingly moved away from the pin 68, and because the pin 68 is now in the central portion of slot 69, no upward force can be exerted on pin 68. In this position, however a small amount of upward force is transmitted to the aneroid capsule 70 by the springs 64, but the very extension of the springs 64 prevents substantial tensile stress from being exerted on the aneroid capsule 70 because the springs 64 permit substantial motion of the link 60 while exerting a comparatively small tensile force on the aneroid capsule 70. As described above with respect to slot 59, slot 69 should also be of appropriate length so that pin 68 does not come in contact with the end of the slot opposite the seat 67.

The present invention is not limited to the use of a link member with two slots, however. An alternative embodiment is shown in FIG. 3, wherein link 160 terminates in a needle 169 having a point 167 resting normally in abutting relationship with a depression 168 in a bushing having the shape of a cup 166. Springs 164 attached between cross arms 162 and the cup 166 serve to hold the link 160 continuously in position with respect to the cup 166, in the absence of a countervailing upward force on the link 160.

While the instant invention has been disclosed as an improvement in a particular type of altimeter, it is to be appreciated that the present stress relieving linkage will be useful in any sort of instrument wherein there is a stronger and a weaker source of torque, and it is desirable to protect the weaker source with a stress relieving linkage.

Having thus described the invention, what is desired to be secured by Letters Patent and hereby claimed is:

1. In an instrument including data display means, a rotatable shaft for driving said data display means, a first data input means, means for connection said first data input means to said rotatable shaft for applying a torque to said shaft in response to the operation of said first data input means, a second data input means, and means for connecting said second data input means to said rotatable shaft for applying a torque to said shaft in response to the operation of said second data input means, the torque applied to said shaft by said first data input means being greater than the torque applied to said shaft by said second data input means, the improvement comprising means for protecting said second data input means from overriding torque from said first data input means interposed in said means for connecting said second data input means to said shaft and comprising:
   (a) a longitudinally extending link;
   (b) means for operatively connecting one end of said link to said second data input means for moving said link longitudinally in response to operation of said second data input means;
   (c) lost motion means in said last mentioned connecting means for permitting relative movement between said link and said second data input means in a longitudinal direction to and from a normal extreme relative position;
   (d) biasing means for urging said link and said second data input means toward said normal relative position;
   (e) means for operatively connecting the other end of said link to said shaft including a shaft connecting member movable concomitantly with said shaft;
   (f) lost motion means for connecting said shaft connecting member to said other end of said link for permitting relative movement between said link and said shaft connecting member in a longitudinal direction to and from a normal extreme relative position; and
   (g) biasing means for urging said shaft connecting member and said link toward said normal relative position.

2. The instrument of claim 1, wherein said instrument is an altimeter, said first data input means is an electric motor, and said second data input means is an aneroid capsule.

3. The instrument of claim 1, wherein at least one of said lost motion means comprises a pin and a slot, and said biasing means are springs.

4. The instrument of claim 3, wherein said instrument is an altimeter, said first data input means is an electric motor, and said second data input means is an aneroid capsule.

5. The instrument of claim 1, wherein at least one of said lost motion means comprises a cup, a pin longitudinally movable in said cup, and the biasing means therefor comprises a spring for urging said pin into said cup.

6. The instrument of claim 5, wherein said instrument is an altimeter, said first data input means is an electric motor, and said second data input means is an aneroid capsule.

7. The instrument of claim 1, wherein
   said link has a first and a second longitudinally extending slot,
   said lost motion means for permitting relative movement between said link and said second data input means comprises a pin connected to said second data input means for movement therewith and slidably disposed within said first slot in said link, and
   said lost motion means for connecting said shaft connecting member to said link comprises a pin connected to said shaft connecting member for movement therewith and slidably disposed within said second slot in said link.

8. The instrument of claim 1, wherein
   said link has a longitudinally extending end and a longitudinally extending slot at the opposite end thereof,
   said lost motion means for permitting relative movement between said link and said second data input means comprises a cup connected to said second data input means for movement therewith, said cup being disposed in disengageably mating relation with said longitudinally extending end, and
   said lost motion means for connecting said shaft connecting member to said link comprises a pin connected to said shaft connecting member for movement therewith and slidably disposed within said slot in said link.

References Cited

UNITED STATES PATENTS

| | | | |
|---|---|---|---|
| 2,279,861 | 4/1942 | Davis | 73—386 |
| 3,083,575 | 4/1963 | Frohardt | 73—384 |
| 3,214,979 | 11/1965 | Bissell et al. | 73—418 |
| 3,230,775 | 1/1966 | Andresen | 73—387 |

DONALD O. WOODIEL, Primary Examiner

U.S. Cl. X.R.

73—387